US012645186B2

(12) United States Patent
Oshita

(10) Patent No.: US 12,645,186 B2
(45) Date of Patent: Jun. 2, 2026

(54) ELECTRONIC TIMEPIECE, DATA PROCESSING METHOD, AND STORAGE MEDIUM STORING PROGRAM

(71) Applicant: CASIO COMPUTER CO., LTD., Tokyo (JP)

(72) Inventor: Yuuki Oshita, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 309 days.

(21) Appl. No.: 18/469,920

(22) Filed: Sep. 19, 2023

(65) Prior Publication Data

US 2024/0103453 A1 Mar. 28, 2024

(30) Foreign Application Priority Data

Sep. 26, 2022 (JP) ................................ 2022-152133

(51) Int. Cl.
*G04G 21/04* (2013.01)
*G04G 21/02* (2010.01)
*G04G 99/00* (2010.01)

(52) U.S. Cl.
CPC ........... *G04G 21/04* (2013.01); *G04G 21/025* (2013.01); *G04G 99/006* (2013.01)

(58) Field of Classification Search
CPC .... G04G 21/04; G04G 21/025; G04G 99/006; G04G 19/02; G04G 21/02; G01S 19/14; G01S 19/34; G01S 19/35; G04C 10/00; G06F 1/14; G06F 1/163; G06F 1/1684; G06F 1/1698; G06F 1/3209; G06F 1/3215; G06F 1/3293
See application file for complete search history.

(56) References Cited

U.S. PATENT DOCUMENTS

| | | | | |
|---|---|---|---|---|
| 2018/0177437 | A1 | 6/2018 | Yoshioka | |
| 2018/0246472 | A1* | 8/2018 | Hasegawa | G04C 10/00 |
| 2019/0212707 | A1* | 7/2019 | Minami | G06F 3/1438 |
| 2019/0391538 | A1 | 12/2019 | Kitamura | |
| 2020/0201421 | A1 | 6/2020 | Minami et al. | |
| 2021/0389816 | A1 | 12/2021 | Weiss et al. | |

FOREIGN PATENT DOCUMENTS

| | | | |
|---|---|---|---|
| JP | 2018048929 | A | 3/2018 |
| JP | 2019007818 | A | 1/2019 |

OTHER PUBLICATIONS

Extended European Search Report dated Feb. 23, 2024 received in European Patent Application No. EP 23197343.9.

* cited by examiner

*Primary Examiner* — Edwin A. Leon
(74) *Attorney, Agent, or Firm* — Scully, Scott, Murphy & Presser, P.C.

(57) ABSTRACT

Systems and methods for an electronic timepiece are described. The electronic timepiece can include a first processor that controls a clocking operation and a second processor that has an arithmetic processing capacity higher than an arithmetic processing capacity of the first processor. The electronic timepiece can further include an information acquisition circuit that is controlled by the second processor.

18 Claims, 3 Drawing Sheets

ELECTRONIC TIMEPIECE, DATA PROCESSING METHOD, AND STORAGE MEDIUM STORING PROGRAM

BACKGROUND OF THE INVENTION

Field of the Invention

The present disclosure relates to an electronic timepiece, a data processing method, and a storage medium storing a program.

Description of the Related Art

Some electronic timepieces, in particular, wristwatches and the like that are portable or wearable have various functions in addition to the function as a timepiece. Such additional functions include measurements of activities and vital signs of a user, acquisition of location information and surrounding environment information, and a communication function.

SUMMARY OF THE INVENTION

An electronic timepiece according to an aspect of the present disclosure includes: an electronic timepiece including: a first processor that controls a clocking operation; a second processor that has an arithmetic processing capacity higher than an arithmetic processing capacity of the first processor; and an information acquisition circuit that is controlled by the second processor.

Further features of the present invention will become apparent from the following description of exemplary embodiments (with reference to the attached drawings).

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein.

DESCRIPTION OF THE EMBODIMENTS

Hereinafter, an embodiment of the present disclosure will be described with reference to the drawings.

Figure 1:
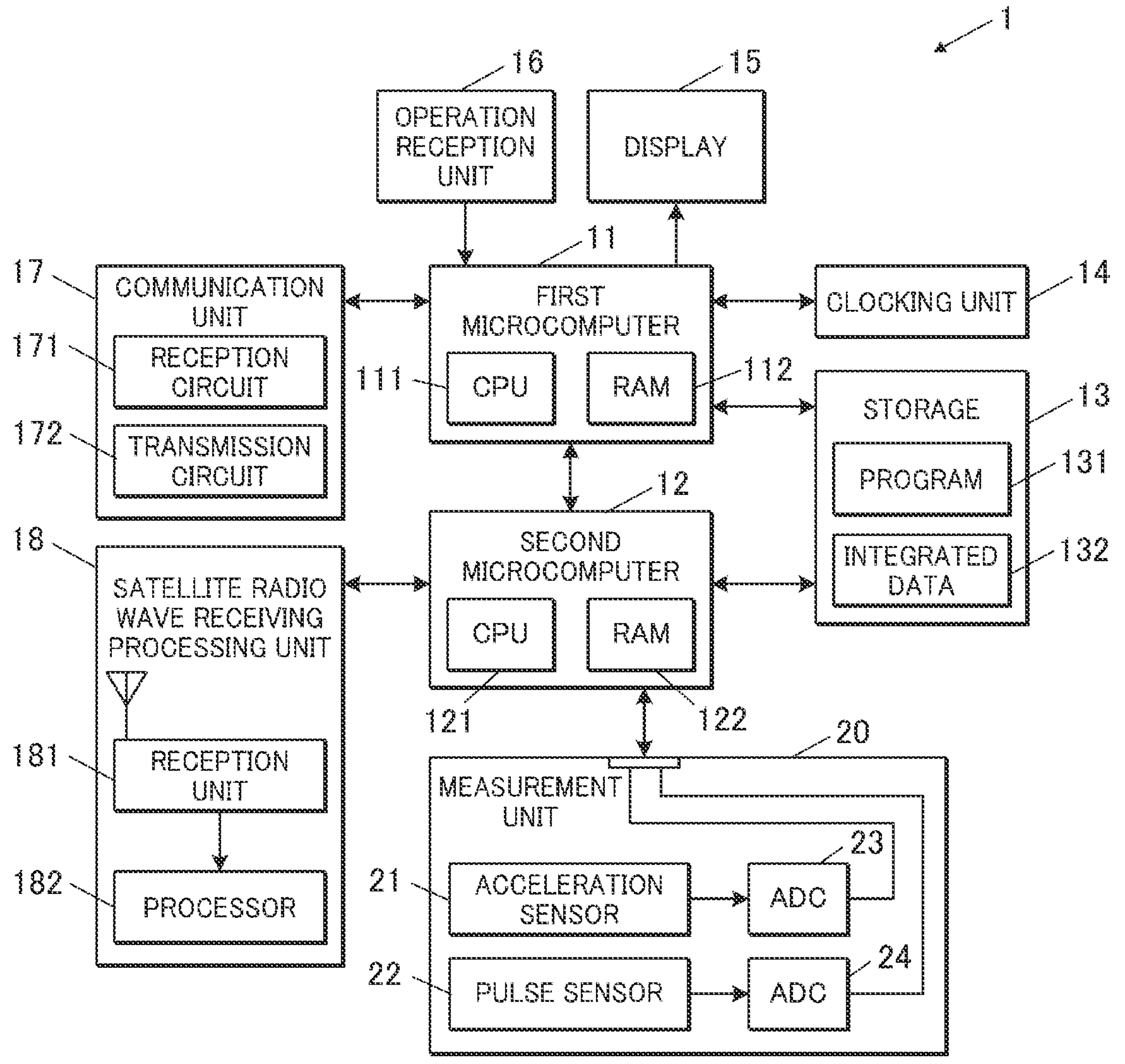
FIG. 1 is a block diagram illustrating a functional configuration of an electronic timepiece of an embodiment of the present disclosure.

FIG. 1 is a block diagram illustrating a functional configuration of an electronic timepiece 1 of this embodiment.

The electronic timepiece 1 includes a first microcomputer 11 (microcontroller unit, MCU) (first controller), a second microcomputer 12 (second controller), a storage 13, a clocking unit 14, a display 15, an operation reception unit 16, a communication unit 17, a satellite radio wave receiving processing unit 18, and a measurement unit 20.

The first microcomputer 11 includes a central processing unit (CPU) 111 and a random access memory (RAM) 112. The CPU 111 is a processor that performs arithmetic processing to control operation in accordance with a program. The RAM 112 provides a working memory space to the CPU 111 and stores temporary data. The first microcomputer 11 also includes an input-output interface (not illustrated). The first microcomputer 11 directly controls the clocking unit 14, the display 15, the operation reception unit 16, and the communication unit 17. The first microcomputer 11 operates continuously. The first microcomputer 11 is suitably designed to perform low-load arithmetic processing, in particular, control operations related to tracking the time and displaying of the time, and it efficiently operates with low consumption of power when the load is low. On the other hand, when a high load is applied to the first microcomputer 11, processing efficiency is reduced, and power consumption increases greatly compared with the increase in load. The first microcomputer 11 operates continuously except when power supply is insufficient.

The second microcomputer 12 includes a CPU 121 and a RAM 122. The CPU 121 has an arithmetic processing capacity higher than that of the CPU 111. In accordance with this, basic power consumption of the second microcomputer 12 is greater than that of the first microcomputer 11. On the other hand, the second microcomputer 12 can quickly and efficiently perform processes that apply a high load on the first microcomputer 11. Thus, since the second microcomputer 12 controls these processes, the total power consumption of these processes is low compared with a case of making the first microcomputer 11 control them. In short, power efficiency of the second microcomputer 12 is lower than that of the first microcomputer 11 at the time of low-load processing, but it is higher than that of the first microcomputer 11 at the time of high-load processing. The RAM 122 provides a working memory space to the CPU 121 and stores temporary data. The second microcomputer 12 also includes an input-output interface (not illustrated). The second microcomputer 12 directly controls the satellite radio wave receiving processing unit 18 and the measurement unit 20 and processes measurement data and calculation data acquired therefrom. When the satellite radio wave receiving processing unit 18 is stopped, and data is not acquired from the measurement unit 20, operation of the second microcomputer 12 may be stopped (suspended), under the control of the first microcomputer 11 or autonomously. The second microcomputer 12 does not track the current time (date and time), independently of the first microcomputer 11 (clocking unit 14).

The first microcomputer 11 and the second microcomputer 12 constitute a computer of the electronic timepiece 1 of this embodiment.

The storage 13 is a non-volatile memory that stores a program 131, various setting data, etc. The storage 13 is, for example, a flash memory, but not limited thereto. At least a part of the storage 13 is able to be accessed (read and written) in a shared manner by both of the first microcomputer 11 and the second microcomputer 12.

The clocking unit 14 has a theoretical regulation unit that divides a frequency signal of a certain frequency output from an oscillator (not illustrated), for example, approximately 32.768 kHz, and that outputs a clocking signal per second by appropriately reducing the signals. The first microcomputer 11 controls a clocking operation for tracking and determining the current date and time (at least the time) based on the clocking signal output from the clocking unit 14. Thus, the first microcomputer 11 can determine the current date and time with an approximately ordinary accuracy of tracking the date and time of the electronic timepiece 1, for example, within a deviation margin of not more than 0.5 seconds per day.

The display 15 has, for example, a digital display screen, and it causes this display screen to perform simple displaying of the current time or contents corresponding to other functional operations, based on control of the first microcomputer 11. The type of the digital display screen is not specifically limited, but it may be a dot-matrix liquid crystal display screen (LCD).

The operation reception unit 16 receives input operation from the outside, such as a user, and outputs an operation signal corresponding to the input operation, to the first microcomputer 11. The operation reception unit 16 has a touch panel that overlies the display screen, for example. Alternatively, or in addition to this, the operation reception unit 16 may also include a pressing button switch and a rotational operation part (crown).

The communication unit 17 (communication circuit) controls data communication with an external device in accordance with a communication protocol (protocol) that allows transmission and reception of data. The communication unit 17 has an antenna and a module that can control communication related to Bluetooth (registered trademark), for example. The communication protocol in this case may not be one that allows high-speed transfer of bulk data and may be Bluetooth Low Energy (BLE), for example. Although not limited to this, BLE communication connection may be continuously established except when a disconnection request is input by a user operation, power supply is insufficient, and communication with a connection target is failed (due to the power of an external device being turned off or other causes). The module is, for example, a network card that supports the above-described communication protocol. The module has a reception circuit 171 that acquires, demodulates, and decodes a radio wave received from the antenna, and obtains an input data signal. The module also has a transmission circuit 172 that encodes and modulates an output data signal, and it transmits the transmission radio wave signal obtained by the encoding and modulating, from the antenna to the outside. The reception circuit 171 and the transmission circuit 172 may share constituent elements within a possible range.

The satellite radio wave receiving processing unit 18 (satellite radio wave receiving processing circuit) has an antenna 180, a reception unit 181, and a processor 182. The antenna 180 receives a radio wave from a positioning satellite related to a global navigation satellite system (GNSS). The reception unit 181 includes a reception circuit that demodulates and decodes a radio wave received by the antenna 180. The reception circuit may have a dedicated circuit for determining a C/A code and demodulating a navigation message. The positioning satellite from which a radio wave is received, may include a satellite related to a global positioning system (GPS), for example. The processor 182 determines the current date and time based on a demodulated navigation message (obtains current time information from the outside) and also performs arithmetic processing for calculating (determining) the current location. The processor 182 may be a dedicated CPU that is specialized in decrypting a navigation message and positioning calculation, or it may be a general-purpose CPU. The antenna 180, the reception unit 181, and the processor 182 are connected with one another by a signal line, along a flow of a received radio wave signal.

The satellite radio wave receiving processing unit 18 receives an electrical signal (control signal) that is transmitted from the second microcomputer 12, via a signal line, and it operates based on the received control signal. Thereby, the operation of the satellite radio wave receiving processing unit 18 is controlled by the second microcomputer 12. Turning on and off of power supply (operation and non-operation) of the satellite radio wave receiving processing unit 18 are switched as necessary. When the satellite radio wave receiving processing unit 18 operates, the processor 182 outputs positioning data, which includes positioning results, as an electrical signal, to the second microcomputer 12 via the signal line. The processor 182 may control switching related to such acquiring and outputting of data.

The measurement unit 20 (measurement circuit) includes sensor elements or sensor modules for measuring a physical quantity and a circuit for connecting them, and it outputs measurement results from the sensors to the second microcomputer 12 at certain intervals (measurement intervals). The sensors include, for example, an acceleration sensor 21 for measuring an exercise state and a movement direction of a user, and a pulse sensor 22 for detecting a vital sign of a user. The pulse sensor 22 may be one that uses a publicly known technique. For example, the pulse sensor 22 may have a circuit or processor that emits light of a certain wavelength to a wrist on which the electronic timepiece 1 is worn, measures a reflection intensity of the light reflected therefrom, and determines the pulse from a fluctuation period of the reflection intensity. An analog signal that shows a measured value of each sensor is input to an analog-digital converter (ADC 23 or 24) via a signal line and is converted into digital data. The ADCs 23 and 24 may be incorporated in modules of corresponding sensors. Each piece of obtained digital data is associated with the date and time and is output to the second microcomputer 12 via a signal line. Alternatively, only digital data of a measured value may be output to the second microcomputer 12. In this case, the second microcomputer 12 may acquire the date and time of acquiring the digital data, from the first microcomputer 11, and it may associate them with the digital data.

The satellite radio wave receiving processing unit 18 and the measurement unit 20 constitute an information acquisition circuit (information acquisition unit) of this embodiment. That is, the information acquisition circuit (information acquisition unit) includes a configuration for acquiring information within an additional and limited time range, which is different from tracking and acquiring of the time and transmission and reception of information related to displaying the time that are a primary operation of a timepiece.

The electronic timepiece 1 may also have a sensor for detecting whether a user is wearing the electronic timepiece 1 (itself) on the user's wrist, in addition to the components described above. Alternatively, the electronic timepiece 1 may determine whether a user is wearing the electronic timepiece 1 on the user's wrist, based on a measurement result of the measurement unit 20. For example, the electronic timepiece 1 determines whether there is a probability that the electronic timepiece 1 is worn on a wrist, based on a measurement result of the acceleration sensor 21. When there is no change in the measured value of the acceleration sensor 21, it is presumed that the electronic timepiece 1 is not used and is left still. When there is a change in the measured value of the acceleration sensor 21, the electronic timepiece 1 then causes the pulse sensor 22 to emit light at appropriate intervals, and it determines the probability that the electronic timepiece 1 is worn on a wrist depending on whether an obtained reflection intensity is within an estimated range.

Alternatively, the electronic timepiece 1 may have one or both of a tilt sensor and an illuminance sensor. The tilt sensor acquires a detection result related to a tilt state and converts the result into digital data, and it outputs the digital data to the first microcomputer 11 via a signal line. The illuminance sensor measures an illuminance of light that enters the electronic timepiece 1, and it then converts the measured value into digital data and outputs the digital data to the first microcomputer 11 via a signal line. The first microcomputer 11 may determine a use state of a user of the electronic timepiece 1 based on these pieces of input data.

The tilt sensor or the illuminance sensor may output detection results at a low frequency and may output a small amount of data, compared with output of measurement results of the measurement unit 20. Thus, the tilt sensor and the illuminance sensor do not greatly increase the processing load of the first microcomputer 11 by their operations. On the other hand, these detection operations may be continuously performed irrespective of the operation state of the second microcomputer 12.

Next, data processing in the electronic timepiece 1 of this embodiment will be described.

In the electronic timepiece 1, the second microcomputer 12 controls the satellite radio wave receiving processing unit 18 and the measurement unit 20, and it acquires and processes output data therefrom.

The second microcomputer 12 performs necessary processing on digital data that is acquired. The processing may include, for example, at least one of coordinate transformation, removal of an initial offset value, and integration of a plurality of pieces of data.

Specifically, a process related to integration of a plurality of pieces of data (integration process) is a process for associating data acquired from the satellite radio wave receiving processing unit 18 and data acquired from each sensor of the measurement unit 20 with each other. For example, an individual measured value may be converted into a value per second by linear interpolation or the like, and integrated data in which timings of the values are matched with each other, may be generated. Alternatively, integrated data may be generated by matching timing of another measured value with timing when certain data is obtained, for example, when the satellite radio wave receiving processing unit 18 obtains measurement result data. These processes correspond to high-load processing for the first microcomputer 11.

Measurement data (herein, integrated data) that is acquired and processed in this manner is stored in the storage 13 as integrated data 132. The first microcomputer 11 is able to read data that is stored in the storage 13, independently of processing of the second microcomputer 12. However, reading of data that is being written by the second microcomputer 12 is restricted. The first microcomputer 11 transmits data that is stored in the storage 13, to an external device installed with an activity management application, a health care application, or the like. The first microcomputer 11 also reads data related to contents to be displayed on the display 15, from the storage 13. The electronic timepiece 1 may be able to display one, some, or all of measurement results on the display 15, in approximately real time. In this case, the first microcomputer 11 directly acquires processed data or display image data, which is generated based on the processed data, from the second microcomputer 12.

Measurement operations of the satellite radio wave receiving processing unit 18 and the measurement unit 20 start, for example, when the operation reception unit 16 receives an operation in relation to start of activity measurement, which is input from a user. The measurement operations are completed, for example, when the operation reception unit 16 receives an operation for instructing finishing the activity measurement, which is input from the user. In addition to this, in the case of being set in advance by an input operation of a user, while the second microcomputer 12 operates, the measurement unit 20 may cause the pulse sensor 22 to continuously perform the measurement operation, for example.

Figure 2:
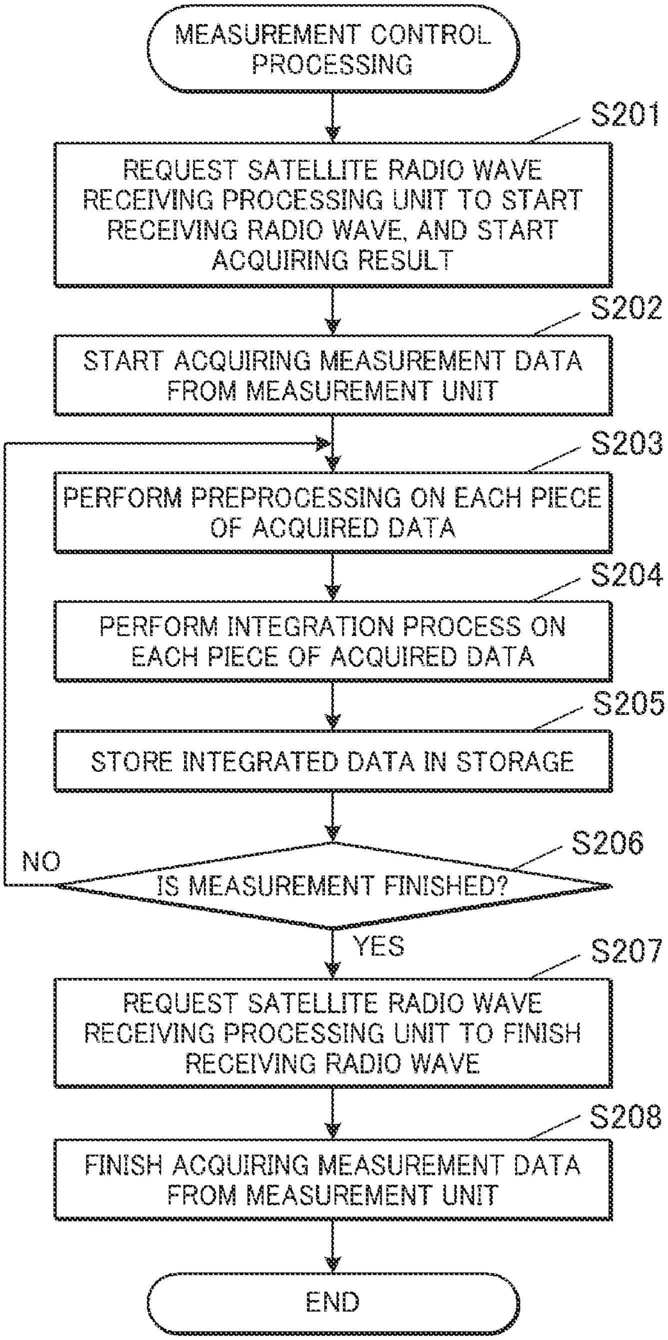
FIG. 2 is a flowchart illustrating a control procedure of measurement control processing.

FIG. 2 is a flowchart illustrating a control procedure of measurement control processing that is executed by the CPU 121 of the second microcomputer 12 in the electronic timepiece 1. This measurement control processing starts, for example, when a request to start activity measurement is received in response to a user performing an input operation to the operation reception unit 16.

The CPU 121 requests the satellite radio wave receiving processing unit 18 to start receiving a radio wave from a positioning satellite and to perform a positioning operation, and it starts acquiring a positioning result (step S201). The CPU 121 starts acquiring measurement data from the measurement unit 20 (step S202).

The CPU 121 performs preprocessing on each piece of the acquired data (step S203). The preprocessing can include coordinate transformation and adjustment of an offset value, which are described above. The CPU 121 performs a process (integration process) for integrating each piece of the acquired data after they are adjusted (step S204; integrating means).

The CPU 121 causes the storage 13 to store the data that has been subjected to the preprocessing and the integration process, as integrated data 132 (step S205). The process of writing in the storage 13 may not be performed on each of the integrated data individually. The CPU 121 may buffer and collect a predetermined number of pieces of integrated data, in the RAM 122, and it may write them in the storage 13 at a time.

The CPU 121 determines whether a request for finishing the measurement is received (step S206). The request is given by an input operation to the operation reception unit 16. When it is determined that the request for finishing the measurement is not received (step S206; NO), the processing of the CPU 121 returns to step S203.

When it is determined that the request for finishing the measurement is received (step S206; YES), the CPU 121 requests the satellite radio wave receiving processing unit 18 to finish receiving a radio wave (step S207). The CPU 121 finishes acquiring the measurement data from the measurement unit 20 (step S208). Then, the CPU 121 completes the measurement control processing.

Figure 3A:
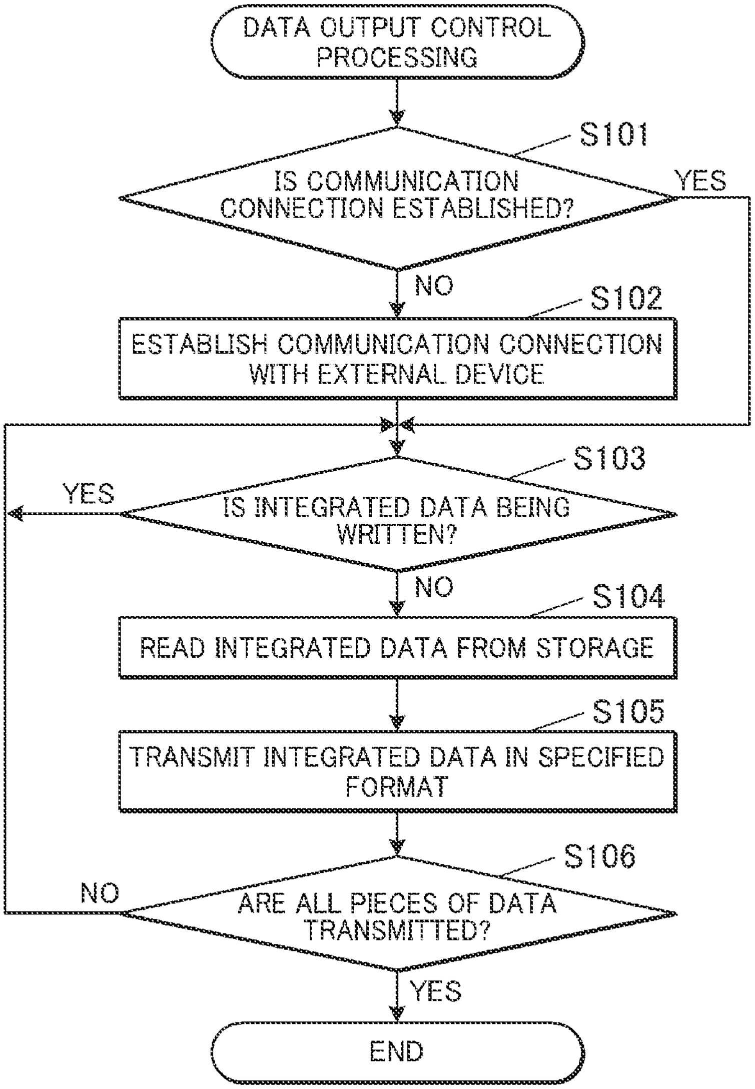
FIG. 3A shows data output control processing.
Figure 3B:
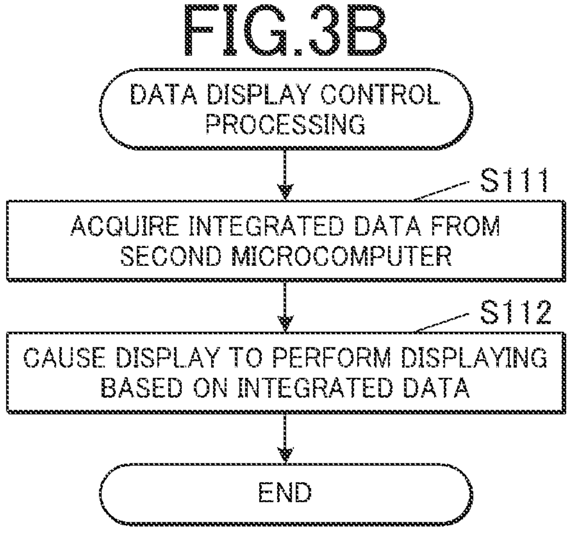
FIG. 3B is a flowchart illustrating a control procedure of data display control processing.

FIG. 3A is a flowchart illustrating a control procedure of data output control processing that is executed by the CPU 111 of the first microcomputer 11 in the electronic timepiece 1. FIG. 3B is a flowchart illustrating a control procedure of data display control processing that is executed by the CPU 111.

For example, the data output control processing illustrated in FIG. 3A is executed at once after activity measurement is completed, or it is executed at appropriate intervals during activity measurement.

The CPU 111 determines whether a communication connection is established with an external device via the communication unit 17 (step S101). When it is determined that the communication connection is established (step S101; YES), the processing of the CPU 111 advances to step S103. When it is determined that the communication connection is not established, the CPU 111 establishes a communication connection with an external device (step S102). Then, the processing of the CPU 111 advances to step S103.

After the processing advances to the process in step S103, the CPU 111 determines whether the CPU 121 of the second microcomputer 12 is writing the integrated data 132 in the storage 13 (step S103). When it is determined that the wiring operation is being performed (step S103; YES), the CPU 111 repeats the process in step S103. The CPU 111 may wait for a certain time before repeating the process in step S103.

When it is determined that the wiring operation of the integrated data 132 is not being performed (step S103; NO), the CPU 111 reads the integrated data 132 from the storage 13 (step S104). The CPU 111 causes the communication unit 17 to sequentially transmit the read integrated data 132 in a specified format, to the external device (step S105). The processes in steps S104 and S105 may be executed on each data portion of appropriate size, in parallel to other processes.

The CPU 111 determines whether all pieces of the integrated data 132 are transmitted (step S106). When it is determined that not all pieces of data are transmitted (there is a piece of data that is still not transmitted) (step S106; NO), the processing of the CPU 111 returns to step S103. When it is determined that all pieces of data are transmitted (step S106; YES), the CPU 111 completes the data output control processing.

The data display control processing illustrated in FIG. 3B is executed intermittently, for example, during execution of activity measurement, or when activity measurement is completed. The CPU 111 acquires the integrated data from the second microcomputer 12 (step S111). The CPU 121 of the second microcomputer 12 may transmit the integrated data in the RAM 122, which is generated as described above, to the first microcomputer 11 in approximately real time, in response to a request from the CPU 111. Alternatively, the CPU 121 may read and transmit the integrated data 132 that is once stored in the storage 13. The CPU 121 may sequentially read necessary portions of the integrated data 132 in response to a request from the CPU 111. Alternatively, the CPU 121 may read one, some, or all pieces of the integrated data 132 at a desired timing before the integrated data is requested from the CPU 111, such as at the start of the display operation. The CPU 111 sets display contents based on the acquired integrated data and causes the display 15 to display the display contents (step S112). Then, the CPU 111 completes the data display control processing.

As described above, the electronic timepiece 1 of this embodiment includes the first microcomputer 11 that controls a clocking operation, the second microcomputer 12 that has an arithmetic processing capacity higher than that of the first microcomputer 11, and the satellite radio wave receiving processing unit 18 and the measurement unit 20 as the information acquisition unit that is controlled by the second microcomputer 12.

In this electronic timepiece 1, the second microcomputer 12, which has a high arithmetic processing capacity, centrally controls operations of the information acquisition unit. With this configuration, the electronic timepiece 1 can make the second microcomputer 12 suitably operate the information acquisition unit. Meanwhile, the electronic timepiece 1 enables avoiding application of an excessive load to the first microcomputer 11, which has a low processing capacity. Thus, in the electronic timepiece 1, the functional operations of the information acquisition unit are efficiently performed, and accordingly, an amount of power consumption is more appropriately reduced. In particular, the electronic timepiece 1 is designed to give top priority to functions of tracking and displaying the time as a timepiece. In the electronic timepiece 1 thus designed, the above-described configuration prevents an excessive load from being applied to the first microcomputer 11, which is specialized in a stable operation of functions of tracking and displaying the time with a low load, over a long period of time. As a result, the operation of the first microcomputer 11 hardly becomes unstable, and the amount of power consumption does not easily and unintentionally increase, whereby the electronic timepiece 1 can stably maintain the functions as a timepiece.

The second microcomputer 12 does not track the current time. As described above, applying an excessive load to the first microcomputer 11 is avoided, and thus, the first microcomputer 11 can stably keep tracking the time. The second microcomputer 12 therefore does not need to track the current time. Thus, it is not necessary for the electronic timepiece 1 to frequently synchronize the tracked date and time between the first microcomputer 11 and the second microcomputer 12. In addition, the electronic timepiece 1 does not need to have a second clocking unit that is used for tracking the time by the second microcomputer 12.

The power efficiency of the second microcomputer 12 is lower than that of the first microcomputer 11 at the time of low-load processing, but it is higher than that of the first microcomputer 11 at the time of high-load processing. With this configuration, the electronic timepiece 1 can make the second microcomputer 12 efficiently execute processes that apply a high load to the first microcomputer 11, such as control of operation of the information acquisition unit and the integration process. In addition, compared with a case in which the first microcomputer 11 executes equivalent processes, an increase in the amount of power consumption is suppressed. On the other hand, in the electronic timepiece 1, the load that is applied to the first microcomputer 11 can be easily limited within a range in which the first microcomputer 11 efficiently executes functions related to tracking and displaying the date and time.

The information acquisition unit includes at least one of the satellite radio wave receiving processing unit 18 that receives a radio wave from a satellite and performs arithmetic processing related to positioning, and the measurement unit 20 that measures a physical quantity. In this manner, in the functional operation for continuously generating data by measurement, the data can be easily and appropriately processed and stored in the storage. The electronic timepiece 1 therefore operates efficiently.

Alternatively, the information acquisition unit includes the satellite radio wave receiving processing unit 18 and the measurement unit 20. The second microcomputer 12 integrates positioning data of the satellite radio wave receiving processing unit 18 and measurement data of the measurement unit 20. The electronic timepiece 1 is thus able to integrate a plurality of pieces of acquired data (measurement data) without using the first microcomputer 11. As a result, in the electronic timepiece 1, processes are efficiently performed by the second microcomputer 12, without applying an excessive load to the first microcomputer 11, that is, without greatly increasing the amount of power consumption due to an inefficient processing operation of the first microcomputer 11.

The electronic timepiece 1 also includes the communication unit 17 that communicates with an external device under the control of the first microcomputer 11. The first microcomputer 11 causes the communication unit 17 to transmit data acquired from the information acquisition unit by the second microcomputer 12, to an external device.

The communication with an external device is controlled by the first microcomputer 11, whereby an operation for receiving from the outside can be stably continued, especially even when operation of the second microcomputer 12 is turned off in the state in which the information acquisition unit connected to the second microcomputer 12 performs no operation. In particular, for a communication protocol that can make a continuous communication with low consumption of power, like BLE, it does not apply a high load to the first microcomputer 11, and therefore, it is more efficient to perform control by the first microcomputer 11.

The electronic timepiece 1 also includes the storage 13 that is able to be read and written (in a shared manner) by both of the first microcomputer 11 and the second microcomputer 12. The data acquired by the information acquisition unit is stored in the storage 13. The first microcomputer 11 reads this data from the storage 13 and causes the communication unit 17 to transmit it to an external device. In this way, the storage 13 enables the first microcomputer 11 to transmit acquired data to the outside, independently of a writing operation of the second microcomputer 12. In other words, data can be transmitted by the first microcomputer 11 even when operation of the second microcomputer 12 is turned off after the second microcomputer 12 finishes controlling the information acquisition unit. Thus, in the electronic timepiece 1, it is possible to efficiently perform each of acquisition of data and output for transmitting data.

The electronic timepiece 1 also includes the display 15 that is controlled by the first microcomputer 11. The first microcomputer 11 causes the display 15 to perform displaying based on data that is acquired from the information acquisition unit by the second microcomputer 12. In this manner, the electronic timepiece 1 makes the first microcomputer 11 control the display 15 that displays the time, which is a primary function as a function related to a timepiece, whereby the time can be continuously and stably displayed. The data that is acquired by the information acquisition unit may also be displayed on the display 15 under the control of the first microcomputer 11. This displaying operation is also performed independently of operation of the second microcomputer 12 and can thereby be efficiently performed.

The operation of the second microcomputer 12 is able to be suspended in the state in which operation of the information acquisition unit is stopped. That is, when the second microcomputer 12 does not need to control the information acquisition unit, the electronic timepiece 1 may stop the operation of the second microcomputer 12 itself. The second microcomputer 12 thus controls a part related to a function that operates temporarily, and therefore, when such control is unnecessary, the electronic timepiece 1 can easily turn off the second microcomputer 12. With this structure, while a user does not use the electronic timepiece 1, such as during a night time, only a process related to a timepiece and other necessary processes can be performed with low consumption of power by efficiently suppressing (reducing) the amount of power consumption.

A data processing method of this embodiment is a data processing method of the electronic timepiece including: the first microcomputer 11 that controls a clocking operation; the second microcomputer 12 that has an arithmetic processing capacity higher than that of the first microcomputer 11; and the information acquisition unit. The information acquisition unit includes the satellite radio wave receiving processing unit 18 that receives a radio wave from a positioning satellite and performs arithmetic processing related to positioning, and the measurement unit 20 that measures a physical quantity. In this data processing method, the second microcomputer 12 controls operation of the information acquisition unit and integrates positioning data acquired from the satellite radio wave receiving processing unit 18, and measurement data acquired from the measurement unit 20, in time sequence.

In this manner, in the data processing method of this embodiment, the electronic timepiece 1 makes the second microcomputer 12 perform processing related to acquisition of various additional pieces of information, independently of the first microcomputer 11 that controls a clocking operation. This enables the first microcomputer 11, which has a low processing capacity, to stably track the time (perform clocking), without increasing a load applied thereto. Simultaneously with this, necessary arithmetic processing and processing for calculating and storing acquired data can be efficiently performed by the second microcomputer 12, which has a high arithmetic processing capacity, without requiring processing of the first microcomputer 11. Thus, this data processing method enables the electronic timepiece 1 to more efficiently perform functional operations except for the function of a timepiece, in parallel to the function related to a timepiece.

The program 131 of this embodiment can cause the computer of the electronic timepiece 1 to appropriately perform functional operations related to the above data processing method. With this structure, the electronic timepiece 1 can efficiently perform a multifunctional operation while continuing the function as a timepiece more stably than an existing one.

The present invention should not be limited to the above-described embodiment, and various modifications and alterations can be made thereto.

For example, although operations related to satellite positioning and measurement using the measurement unit 20 are performed when activity measurement is executed in the above embodiment, the operations are not limited thereto. For example, health care information or the like may be obtained at appropriate intervals, or the present invention may be used in work management or entrance control in a business environment.

The electronic timepiece 1 may not have both the satellite radio wave receiving processing unit 18 and the measurement unit 20. That is, the electronic timepiece 1 may have only one of these units. In addition, in the case in which the electronic timepiece 1 does not have the measurement unit 20, or the electronic timepiece 1 does not have the satellite radio wave receiving processing unit 18 and the measurement unit 20 has only a single sensor, there is no need to perform the integration process of a plurality of pieces of acquired data (measurement data). Moreover, basically, it is not necessary to integrate pieces of data that are not required to be integrated.

The electronic timepiece 1 may have a component other than the satellite radio wave receiving processing unit 18 and the measurement unit 20, as a functional component controlled by the second microcomputer 12. For example, the electronic timepiece 1 may acquire measurement data from an external measurement device, under the control of the second microcomputer 12, by using Wi-Fi (wireless LAN) or the like. Alternatively, the electronic timepiece 1 may receive a request for authentication information by using a near field communication (NFC) function, and it may confirm passing of a check point during activity.

The communication unit 17 may be intermittently started and be controlled by the second microcomputer 12, to operate communication using a communication system other than a system that continuously performs communication, like a BLE system. In this case, an area to be read and written by the first microcomputer 11 and an area to be read and written by the second microcomputer 12 may be different from each other in the storage 13.

The above embodiment is described on the assumption that the single second microcomputer 12 controls operations of both of the satellite radio wave receiving processing unit 18 and the measurement unit 20, but the configuration is not limited thereto. Components that perform the functional operations may be controlled by separate second microcomputers 12. In this case, reading from and writing in the storage 13 and the integration process of data may be performed by still another second microcomputer 12, or a second microcomputer 12 related to one of the functional operations may execute these processes together.

The display 15, which is controlled by the first microcomputer 11, may not be able to display a current result during activity measurement, in real time. Alternatively, the display 15 may be able to display only a lapse of time that can be measured without using the second microcomputer 12, together with displaying of indicating execution of activity measurement.

The first microcomputer 11 may directly read the integrated data 132, which is stored by the second microcomputer 12, from the storage 13, and it may control displaying based on contents of the read data. This enables the first microcomputer 11 to perform a display control operation without using the second microcomputer 12. In this case, it is necessary for the first microcomputer 11 to be able to determine an address at which the second microcomputer 12 writes. For example, the second microcomputer 12 notifies the first microcomputer 11 of a storing address of data obtained at certain reference timing, and it stores subsequent data in an address corresponding to a time difference from the reference timing (irrespective of lack of data).

In the case in which the second microcomputer 12 reads the integrated data from the storage 13 in accordance with a request from the first microcomputer 11, as in the above embodiment, the second microcomputer 12 can allocate and change any storage location or the like of integrated data within a range that it manages the storage location by itself. In addition, the second microcomputer 12 can set a processing order and timing of accessing (reading from and writing in) the storage 13, as appropriate.

The above embodiment is described on the assumption that the second microcomputer 12 transmits the integrated data to the first microcomputer 11 and that the first microcomputer 11 controls to perform displaying in accordance with specific display contents. However, the present invention is not limited thereto. When a process for generating image data to be displayed on the display 15 can apply an excessive load to the first microcomputer 11, the second microcomputer 12 may generate image data based on the integrated data, control data for displaying an image, and the like, and it may transmit them to the first microcomputer 11.

The integration process of data is not limited to a process for adjusting timing in time sequence. For example, the integration process also includes a process for performing coordinate transformation on pieces of data that are measured in different space coordinate systems so as to integrate them. Alternatively, or in addition to this, one piece of measurement data may be corrected based on the other piece of measurement data. In addition, measurement data may be subjected to a simple analysis and a conversion process. For example, the number of steps of a user may be calculated based on acceleration measurement data. It may be determined whether the number of steps is obtained due to walking or running, or another determination may be performed, and the result may be added to output data as additional information. Measurement data of atmospheric pressure may be converted into an altitude (elevation).

The above embodiment is described on the assumption that the first microcomputer 11 controls a clocking operation and the second microcomputer 12 does not track the date and time, but this description does not necessarily mean that the second microcomputer 12 performs no clocking operation at any time. The second microcomputer 12 may temporarily track the date and time as necessary, in parallel to operation of the first microcomputer 11.

In the above description, the storage 13, which is composed of a flash memory or another nonvolatile memory, is described as an example of a computer-readable medium that stores the program 131 related to operation control of the present invention. However, the computer-readable medium is not limited thereto. Other computer-readable medium, for example, other nonvolatile memory such as a MRAM, or a portable storage medium such as a hard disk drive (HDD), a CD-ROM, or a DVD disc, can also be used. In addition, a carrier wave (carrier) can also be used in the present invention as a medium that provides data of the program of the present invention via a communication line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-152133, filed on Sep. 26, 2022 which is hereby incorporated by reference wherein in its entirety.

What is claimed is:

1. An electronic timepiece comprising:

a first processor that controls a clocking operation;

a second processor that has an arithmetic processing capacity higher than an arithmetic processing capacity of the first processor; and an information acquisition circuit that is controlled by the second processor, wherein:

the information acquisition circuit includes a satellite radio wave receiving processing circuit that receives a radio wave from a positioning satellite and performs arithmetic processing related to positioning, and a sensor that measures a physical quantity; and the second processor integrates positioning data of the satellite radio wave receiving processing circuit and measurement data of the sensor, in time sequence.

2. The electronic timepiece according to claim 1, wherein the second processor does not track a current time.

3. The electronic timepiece according to claim 1, wherein power efficiency of the second processor is lower than power efficiency of the first processor at time of low-load processing, and power efficiency of the second processor is higher than power efficiency of the first processor at time of high-load processing.

4. The electronic timepiece according to claim 1, wherein the information acquisition circuit includes at least one of a satellite radio wave receiving processing circuit configured to receive a radio wave from a satellite and perform arithmetic processing related to positioning and a sensor configured to measure a physical quantity.

5. The electronic timepiece according to claim 1, further comprising a communication circuit configured to be controlled by the first processor to communicate with an external device, wherein:

the first processor is configured to cause the communication circuit to transmit, to the external device, data that is acquired from the information acquisition circuit by the second processor.

6. The electronic timepiece according to claim 5, further comprising a memory configured to be able to be read and written in a shared manner by the first processor and the second processor, wherein:

data that is acquired by the information acquisition circuit is stored in the memory, and the first processor is configured to read the data from the memory and cause the communication circuit to transmit the data to the external device.

7. The electronic timepiece according to claim 1, further comprising a display configured to be controlled by the first processor, wherein;

the first processor is configured to control the display to perform displaying based on data that is acquired from the information acquisition circuit by the second processor.

8. The electronic timepiece according to claim 1, wherein operation of the second processor is able to be suspended in a state in which operation of the information acquisition circuit is stopped.

9. A method performed by an electronic timepiece, the electronic timepiece comprising: a first processor that controls a clocking operation; a second processor that has an arithmetic processing capacity higher than an arithmetic processing capacity of the first processor; and an information acquisition circuit comprising: a satellite radio wave receiving processing circuit that receives a radio wave from a positioning satellite and performs arithmetic processing related to positioning; and a sensor that measures a physical quantity, and the method comprising:

controlling, by the second processor, operation of the information acquisition circuit and integrating, by the second processor, positioning data that is acquired from the satellite radio wave receiving processing circuit and measurement data that is acquired from the sensor, in time sequence.

10. The method according to claim 9, wherein:

the electronic timepiece further comprises a communication circuit that is controlled by the first processor to communicate with an external device, and the method further comprises:

causing, by the first processor, the communication circuit to transmit, to the external device, data that is acquired from the information acquisition circuit by the second processor.

11. The method according to claim 10, wherein:

the electronic timepiece further comprises a memory that is able to be read and written in a shared manner by the first processor and the second processor, data that is acquired by the information acquisition circuit is stored in the memory, and the method further comprises:

reading the data from the memory and causing the communication circuit to transmit the data to the external device, by the first processor.

12. The method according to claim 9, wherein:

the electronic timepiece further comprises a display that is controlled by the first processor, and the method further comprises:

controlling, by the first processor, the display to perform displaying based on data that is acquired from the information acquisition circuit by the second processor.

13. The method according to claim 9, further comprising:

suspending, by the second processor, operation in a state in which operation of the information acquisition circuit is stopped.

14. A non-transitory computer-readable storage medium, storing a program executable by one or more processors in an electronic timepiece, the electronic timepiece comprising: a first processor that controls a clocking operation; a second processor that has an arithmetic processing capacity higher than an arithmetic processing capacity of the first processor; and an information acquisition circuit comprising: a satellite radio wave receiving processing circuit that receives a radio wave from a positioning satellite and performs arithmetic processing related to positioning; and a sensor that measures a physical quantity, and the program causing the one or more processors to perform:

controlling, by the second processor, operation of the information acquisition circuit and integrating, by the second processor, positioning data that is acquired from the satellite radio wave receiving processing circuit and measurement data that is acquired from the sensor, in time sequence.

15. The non-transitory computer-readable storage medium according to claim 14, wherein;

the electronic timepiece further comprises a communication circuit that is controlled by the first processor to communicate with an external device, and the program causes the one or more processors further to perform:

causing, by the first processor, the communication circuit to transmit, to the external device, data that is acquired from the information acquisition circuit by the second processor.

16. The non-transitory computer-readable storage medium according to claim 15, wherein:

the electronic timepiece further comprises a memory that is able to be read and written in a shared manner by the first processor and the second processor, and the program causes the one or more processors further to perform:

reading, by the first processor, the data from the memory and causing the communication circuit to transmit the data to the external device.

17. The non-transitory computer-readable storage medium according to claim 14, wherein:

the electronic timepiece further comprises a display that is controlled by the first processor, and the program causes the one or more processors further to perform:

causing, by the first processor, the display to perform displaying based on data that is acquired from the information acquisition circuit by the second processor.

18. The non-transitory computer-readable storage medium according to claim 14, wherein:

the program causes the one or more processors further to perform:

suspending operation of the second processor in a state in which operation of the information acquisition circuit is stopped.

* * * * *